US007073605B2

(12) United States Patent
Saito et al.

(10) Patent No.: US 7,073,605 B2
(45) Date of Patent: Jul. 11, 2006

(54) IMPACT DRILL

(75) Inventors: Takuma Saito, Ibaraki (JP); Shinki Ohtsu, Ibaraki (JP); Hideki Watanabe, Ibaraki (JP); Junichi Toukairin, Ibaraki (JP)

(73) Assignee: Hitachi Koki Co., Ltd., Tokyo (JP)

(*) Notice: Subject to any disclaimer, the term of this patent is extended or adjusted under 35 U.S.C. 154(b) by 0 days.

(21) Appl. No.: 11/070,163

(22) Filed: Mar. 3, 2005

(65) Prior Publication Data

US 2005/0194164 A1 Sep. 8, 2005

(30) Foreign Application Priority Data

Mar. 5, 2004 (JP) ........................ P 2004-061881

(51) Int. Cl.
*B23B 45/16* (2006.01)

(52) U.S. Cl. ........................................ 173/48; 173/109

(58) Field of Classification Search .................. 173/13, 173/48, 201, 216, 104, 109, 178, 210, 212
See application file for complete search history.

(56) References Cited

U.S. PATENT DOCUMENTS

| | | | | |
|---|---|---|---|---|
| 3,680,642 | A * | 8/1972 | Kirn et al. | 173/13 |
| 3,693,728 | A * | 9/1972 | Stroezel | 173/13 |
| 3,777,825 | A * | 12/1973 | Gullich | 173/13 |
| 3,834,468 | A * | 9/1974 | Hettich et al. | 173/48 |
| 4,158,970 | A * | 6/1979 | Laughon | 74/526 |
| 4,232,749 | A * | 11/1980 | Rohrbach | 173/48 |
| 4,418,766 | A * | 12/1983 | Grossmann | 173/13 |
| 5,159,986 | A * | 11/1992 | Hoser | 173/48 |
| 5,343,961 | A * | 9/1994 | Ichikawa | 173/48 |
| 5,447,205 | A * | 9/1995 | Thurler | 173/48 |
| 5,653,294 | A * | 8/1997 | Thurler | 173/48 |

FOREIGN PATENT DOCUMENTS

| | | |
|---|---|---|
| DE | 2 144 449 | 3/1973 |
| JP | 62-74582 | 4/1987 |
| JP | 2-30169 | 8/1990 |
| JP | 3-178708 | 8/1991 |
| JP | 4-240010 | 8/1992 |
| JP | 8-323520 | 12/1996 |
| JP | 2754047 | 3/1998 |
| JP | 3002284 | 11/1999 |

* cited by examiner

*Primary Examiner*—Scott A. Smith
(74) *Attorney, Agent, or Firm*—McGinn IP Law Group, PLLC

(57) ABSTRACT

An impact drill includes a first ratchet rotating along with a spindle and movable in an axial direction, a second ratchet engaged with the first ratchet and movable in a axial direction but unrotatable, and a spring provided between the second ratchet and a partial member of a housing. An amount of movement of the spindle in the axial direction is regulated, so that the pressing force is too excessive, the restoring force of the spring urging the second ratchet is controlled to maintain a state of generating a set stroke force.

15 Claims, 9 Drawing Sheets

IMPACT DRILL

BACKGROUND OF THE INVENTION

1. Field of the Invention

The present invention relates to an impact drill for use in a drilling operation on a concrete, mortar or tile, for example, and more particularly to an impact drill having a drill mode for performing a drilling operation by rotating a drill bit and an impact drill mode for performing a drilling operation by rotating and vibrating the drill bit.

2. Description of the Related Art

FIG. 1 shows a conventional example of the impact drill of this kind. In FIG. 1, reference numeral 1 denotes a main frame portion that forms an outer shell of the impact drill and has the self-contained parts at predetermined positions, comprising a gear cover 17, an inner cover 18, an outer cover 19, a housing 7 and a handle portion 6. Reference numeral 2 denotes a spindle inserted transversely through the gear cover 17, and 3 denotes a drill chuck attached at the top end of the spindle. A rotational ratchet 4 is mounted near the central part of the spindle 2. The rotational ratchet 4 is rotated along with the rotation of the spindle 2, and moved along with the axial movement of the spindle 2. The serrated irregularities are formed on one face 4*a* of the rotational ratchet 4.

Reference numeral 5 denotes a stationary ratchet disposed at a position opposed to the rotational ratchet 4, in which the serrated irregularities are also formed on one face 5*a* of the stationary ratchet. The stationary ratchet 5 has a hollow cylindrical shape, and is fixed to the inner cover 18, irrespective of the rotation and axial movement of the spindle 2.

On the other hand, a motor 8 is disposed inside the housing 7 linked to the handle portion 6. A rotational driving force of the motor 8 is transmitted via a rotation shaft 9 to a gear 10. Since the gear 10 is press fit into a second pinion 11, the rotational driving force is transmitted to the second pinion 11. The second pinion 11 has two pinion portions 11*a*, 11*b* having a different number of teeth, which are engaged with a low speed gear 12 and a high speed gear 13, respectively. When the second pinion 11 is rotated, both the gears 12, 13 are also rotated.

Reference numeral 14 denotes a clutch disk engaged with the spindle 2 and mounted to be slidable in the axial direction. If the clutch disk 14 is inserted into a concave portion of the low speed gear 12, the rotation of the second pinion 11 is transmitted via the low speed gear 12 and the clutch disk 14 to the spindle 2, as shown in FIG. 1. On the other hand, if the clutch disk 14 is slid to the right from the position of FIG. 1, and inserted into a concave portion of the high speed gear 13, the rotation of the second pinion 11 is transmitted via the high speed gear 13 and the clutch disk 14 to the spindle 2. Accordingly, the spindle 2 can be rotated at low speed or high speed by movement of the clutch disk 14.

Reference numeral 15 denotes a change lever for changing the operation mode of the impact drill, namely, between a drill mode and an impact drill mode. A change shaft 16 is press fit into the change lever 15, whereby when the change lever 15 is rotated, the change shaft 16 is also rotated. The change shaft 16 has a notch portion 16*a*, as shown in FIGS. 2, 3 and 4, whereby when the notch portion 16*a* is at the position of FIG. 2, the impact drill is operated in the drill mode, while when the notch portion 16*a* is at the position of FIG. 3, the impact drill is operated in the impact drill mode.

(A) Drill Mode

When a drill bit (not shown) attached in the drill chuck 3 is contacted with a machined surface and the handle portion 6 is pressed in a direction of the arrow in FIG. 1, an end part of the spindle 2 makes contact with the change shaft 16 to be immovable to the right, when the notch portion 16*a* of the change shaft 16 is at the position of FIG. 2. Accordingly, there is no contact between the irregular face 4*a* of the rotational ratchet 4 and the irregular face 5*a* of the stationary ratchet 5. Accordingly, a rotational driving force of the motor 8 is transmitted via the low speed gear 12 or high speed gear 13 to the spindle, so that the drill bit is given a rotational force.

(B) Impact Drill Mode

In an impact drill mode, the notch portion 16*a* of the change shaft 16 is brought into the position of FIG. 3 by rotating the change lever 15. Then, the drill bit attached in the drill chuck 3 is contacted with a machined surface. If the handle portion 6 is pushed in a direction of the arrow in FIG. 1, an end part of the spindle 2 enters the notch portion 16*a*, as shown in FIG. 4. That is, the spindle 2 is slightly moved to the right, so that the irregular face 4*a* of the rotational ratchet 4 is contacted with the irregular face of the stationary ratchet 5.

In drilling the machined surface, if the spindle 2 is rotated in the state of FIG. 4, the rotational ratchet 4 is meshed and engaged with the stationary ratchet 5, and rotated to cause vibration due to the irregular faces of both the ratchets 4 and 5. This vibration is transmitted through the spindle 2 to the drill bit (not shown). That is, the drill bit is given a rotational force and vibration to perform a drilling operation.

However, when the impact drill is operated in the impact drill mode, the vibration caused by rotation of the spindle in the state where the irregular faces of the ratchets 4 and 5 are contacted under pressure is transmitted not only to the drill bit, but also through the stationary ratchet 5 and the inner cover 18 from the housing 7 to the handle portion 6. Therefore, there is a problem that the user of the impact drill undergoes a great vibration, and feels uncomfortable. Especially when the impact drill is continuously employed for a long time, care must be taken not to transmit the vibration to the user and cause adverse effect on the health of the user.

Several proposals for reducing the vibration transmitted to the user have been made. For example, in JP-UM-B-2-30169, a structure was disclosed in which a clutch cam 22 is supported movably in the axial direction of the spindle 20, and pressed and urged to a rotary cam 21 by a spring 23, as shown in FIG. 5. In FIG. 5, reference numeral 21 denotes a rotary cam that is rotated along with the spindle 20. A cam face 21*a* of the rotary cam 21 is formed with serrated irregularities.

On the other hand, the clutch cam 22 is composed of a hollow cylindrical portion slidable in the axial direction of the spindle 20 and a flange portion 22*b*. A cam face 22*c* of the flange portion 22*b* is formed with a serrated irregular face.

The spring 23 is provided between the flange 22*b* of the clutch cam 22 and a plate 24*a* engaging a groove 22*a* of the clutch cam 22, and always urges the clutch cam 22 toward the rotary cam 21. Thus, when the spindle 20 is moved backward, the cam faces 21*a* and 22*c* are contacted under pressure. If a pressing force applied to the spindle 20 overcomes a resilient force of the spring 23, the spring 23 is compressed, so that the clutch cam 22 is moved backward (to the right in the figure). When the clutch cam 22 is moved forward from the back position due to a resilient force of the spring 23, it strikes against the rotary cam 21, so that the rotary cam 21 is vibrated together with the spindle 20.

With this structure, since the vibration caused by contact between the cam faces 21*a* and 22*c* is relieved by the spring 23 and transmitted to the handle portion (not shown), there is the effect that the vibration transmitted to the user is reduced as compared with the structure in which the ratchet 5 is firmly disposed as shown in FIG. 1.

On the other hand, FIGS. 6 and 7 are schematic views showing the above structure in which the change shaft 16 and the change lever 15 as shown in FIGS. 2, 3 and 4 are disposed at the right end portion of the spindle 20 as shown in FIG. 5. In FIGS. 6 and 7, a spring 25 is additionally inserted between the rotary cam 21 and the plate 24*a* to prevent the spindle 20 from being moved to the right.

When the notch portion 16*a* of the change shaft 16 is at the position as shown in FIG. 6, the impact drill is operated in the drill mode in which the cam faces 21*a* and 22*c* are always out of contact. Also, when the notch portion 16*a* of the change shaft 16 is at the position as shown in FIG. 7, the impact drill is operated in the impact drill mode in which the cam faces 21*a* and 22*c* are contacted and collided.

In this impact drill mode, if a pressing force is applied to the main body (not shown), the spindle 20 is moved to the right. However, when the pressing force is weak, a right end portion of the spindle 20 slightly enters the notch portion 16*a*, and the cam faces 21*a*and 22*c* of FIG. 7 are lightly contacted, so that the back movement amount of the clutch cam 22 is small, the restoring force of the spring 23 is small, and a stroke force from the clutch cam 22 to the rotary cam 21 is reduced.

On the other hand, when the pressing force is strong, a right end portion of the spindle 20 deeply enters the notch portion 16*a*, and the cam faces 21*a* and 22*c* are greatly engaged, so that the clutch cam 22 is greatly moved backward, whereby the restoring force of the spring 23 is great, and the stroke force from the clutch cam 22 to the rotary cam 21 is significant.

Herein, when an object to be drilled which is hard and thin tile or concrete is positioned for drilling, or drilled prudently, it is necessary to sustain a state where the pressing force is weakened to suppress the stroke force, as described above. Several proposals have been conventionally made for the structure in which the magnitude of stroke force is adjustable.

In Japanese Patent No. 3002284, the maximal movement amount of the rotational ratchet and the spindle is made larger than engageable with the stationary ratchet, in which the stationary ratchet is provided movably in the axial direction, and biased forward by the spring. A biasing force of the spring is adjusted by changing a force for pressing the main body.

In JP-A-62-74582, there was described an impact drill in which the rotational ratchet and the spindle can not be moved in the axial direction, and the stationary ratchet is provided movably in the axial direction, and biased forward by the spring, whereby a member for regulating the axial movement of the stationary ratchet is provided adjustably from the outside. The stationary ratchet is regulated from moving forward beyond a predetermined position by adjusting the regulating member, so that the intermeshing depth of ratchets is adjusted.

In Japanese Patent No. 2754047, there was described an impact drill in which the rotational ratchet and the spindle can not be moved in the axial direction, and the stationary ratchet is provided movably in the axial direction, and biased forward by the spring, whereby a second spring for adjusting the compression amount from the outside is provided, in addition to a first spring for always biasing the stationary ratchet. By adjusting the compression amount from the outside, a combination of the first spring and the second spring is varied to adjust the biasing force of the spring.

In JP-A-3-178708, there was described an impact drill in which the rotational ratchet and the spindle are provided to be movable backward to the position at which they are engaged with the stationary ratchet, and the stationary ratchet is provided movably in the axial direction, and biased forward by the spring, whereby the axial position of a spring seat is provided adjustably from the outside. The biasing force of the spring is adjusted by moving the spring seat from the outside. Also, there was described a similar impact drill in which the length of an outer frame itself is provided adjustably. In this case, the biasing force of the spring is adjusted by changing the length of the outer frame itself.

In JP-A-4-240010, there was described an impact drill in which the rotational ratchet and the spindle are provided to be movable backward to the position at which they are engaged with the stationary ratchet, and the stationary ratchet is provided movably in the axial direction, and biased forward by the spring, whereby the axial position of a seat accepting the spring from behind is provided adjustably from the outside. The biasing force of the spring is adjusted by changing the axial position of the seat accepting the spring from behind.

SUMMARY OF THE INVENTION

In Japanese Patent No. 3,002,284, it is difficult to keep the pressing force constant, and particularly when a small stroke force is attained by the weak pressing force, the stroke force is too excessive if the pressing force is too strong, resulting in a problem that the fragile partner member is possibly broken.

In JP-A-62-74582 the vibration transmitted from the spindle to the housing is not relieved, and the intermeshing depth of ratchets may be reduced but the relative position of the ratchet and the spring is invariable, resulting in a problem that the biasing force of the spring can not be weakened. Likewise, with this constitution, the intermeshing depth of ratchets may be increased, but the relative position of the ratchet and the spring is invariable, whereby the biasing force of the spring could not be increased. That is, with this constitution, the intermeshing depth of ratchets may be changed but the relative position of the ratchet and the spring is invariable, resulting in a problem that the adjustment width of the stroke force is small.

In Japanese Patent No. 2754047, JP-A-3-178708, and JP-A-4-240010, the vibration transmitted from the spindle to the housing is not relieved, and the biasing force of the spring may be changed but the intermeshing depth of ratchets may not be changed, resulting in a problem that the adjustment width of the stroke force is small.

It is an object of the invention to provide an impact drill that solves the above-mentioned problems associated with the prior art. It is a further object of the invention to provide an impact drill in which a state of generating a set stroke force is maintained even if the biasing force is excessive, the adjustment width of the stroke force is large, and the vibration transmitted to the user is reduced.

According to one aspect of the invention, there is provided with an impact drill including: a spindle rotated by a motor and movable in an axial direction; a drill chuck fixed to the spindle and mountable with a drill bit; a first ratchet fixed to the spindle and having a face of an irregular portion; a second ratchet having a face of an irregular portion opposed to the face of the irregular portion of the first ratchet and movable in the axial direction but unrotatable; and a spring for urging the second ratchet in a direction of the first ratchet, in which the spindle is given an axial vibration by a contact and separation action between the irregular faces of the first and second ratchets due to a relative rotation of the first ratchet to the second ratchet, wherein a regulating member regulates an amount of movement of the spindle at a plurality of positions in a range where the first and second ratchets can be engaged.

According to another aspect of the invention, the regulating member is movable relative to a main frame portion to come into contact with the spindle. The regulating member is formed to gradually change an interval between the spindle and the regulating member, when the regulating member is moved relative to the main frame portion.

According to another aspect of the invention, the regulating member has a columnar shape. The regulating member has a plurality of notch portions having a different distance from a center of the regulating. The regulating member is rotatably provided in the main frame portion so as to make the notch portions contactable with the spindle.

According to another aspect of the invention, the regulating member has a plate-like shape. The regulating member has a plurality of step portions having a different depth. The regulating member is movably provided in the main frame portion so as to make the step portions contactable with the spindle.

According to another aspect of the invention, the movement amount of the spindle movable in the axial direction is regulated to be a minimum value (as a first mode). The movement amount of the spindle movable in the axial direction is regulated to be a middle value (as a second mode). The movement amount of the spindle movable in the axial direction is regulated to be a maximum value (as a third mode).

According to another aspect of the invention, the first mode is a mode of regulating the movement amount of the spindle to an extent that the irregular portion of the first ratchet and the irregular portion of the second ratchet are contacted with each other. The second mode is a mode of regulating the movement amount of the spindle to an extent that the irregular portion of the first ratchet and the irregular portion of the second ratchet are engaged with each other at a bottom portion of the first ratchet and the second ratchet. The third mode is a mode of regulating the movement amount of the spindle to an extent that the irregular portion of the first ratchet and the irregular portion of the second ratchet are engaged with each other to a bottom portion of the first ratchet and the second ratchet. The second ratchet is further moved backward by pressing a main frame of the impact drill onto a workpiece.

According to another aspect of the invention, a fourth mode of regulating the movement amount of the spindle to an extent that the irregular portion of the first ratchet and the irregular portion of the second ratchet are not contacted with each other.

Since the amount of back movement of the spindle and the rotational ratchet is regulated, the work may be performed with such a pressing force that the spindle comes into contact with the regulating member, whereby even though the pressing force is further increased, the compression amount of the spring is not increased, and the biasing force of the spring is not increased, so that the stroke force does not become excessive to prevent the partner member from being broken.

When the stroke force is weakened, the amount of back movement of the spindle and the rotational ratchet is regulated to be smaller, whereby the intermeshing depth of ratchets is not only shallower, but also the compression amount of the spring is reduced, so that the biasing force of the spring can be weakened. Accordingly, the stroke force can be weaker than conventionally, and therefore made adequate for the fragile partner member.

Moreover, when the stroke force is intensified, the amount of back movement of the spindle and the rotational ratchet is regulated to be larger, whereby the intermeshing depth of ratchets is not only deeper, but also the compression amount of the spring is increased, so that the biasing force of the spring can be intensified. Accordingly, the stroke force can be stronger than conventionally, and therefore made adequate for the partner member difficult to be drilled.

If the work is performed with such a pressing force that the spindle does not come into contact with the regulating member, the vibration of the spindle in the axial direction is relieved and transmitted via the ratchet and the spring to the outer frame portion, whereby the operator performs the work comfortably with less vibration transmitted to the operator.

DESCRIPTION OF THE PREFERRED EMBODIMENTS

Figure 1:
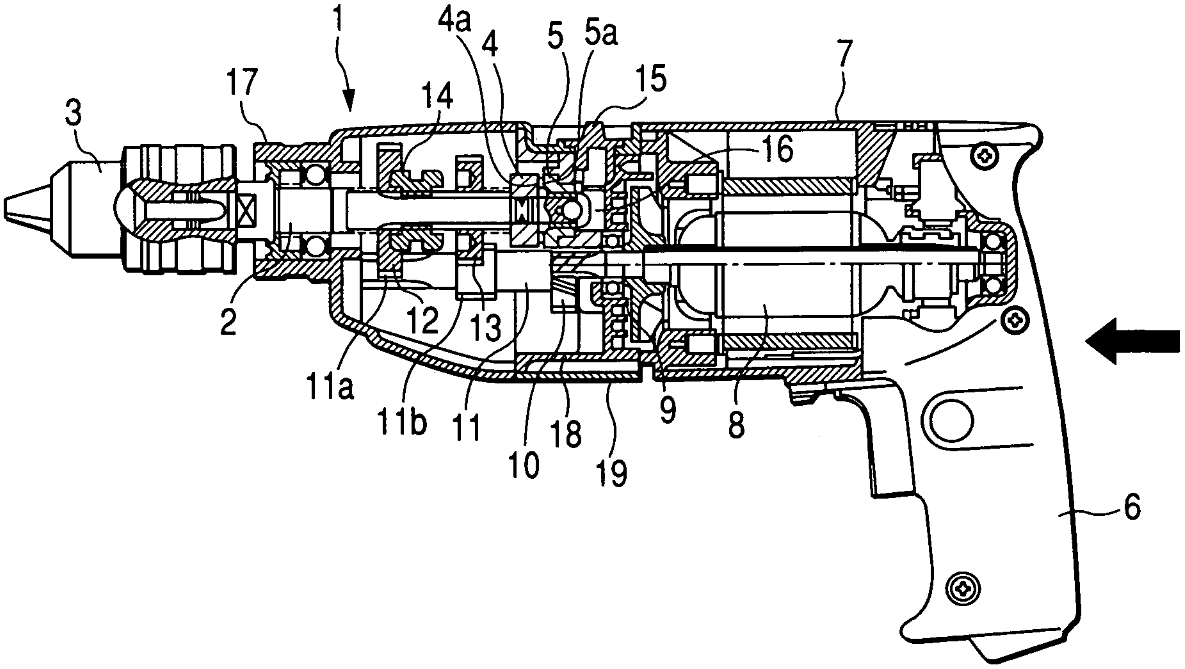
FIG. 1 is a cross-sectional view showing one example of the conventional impact drill.
Figure 2:
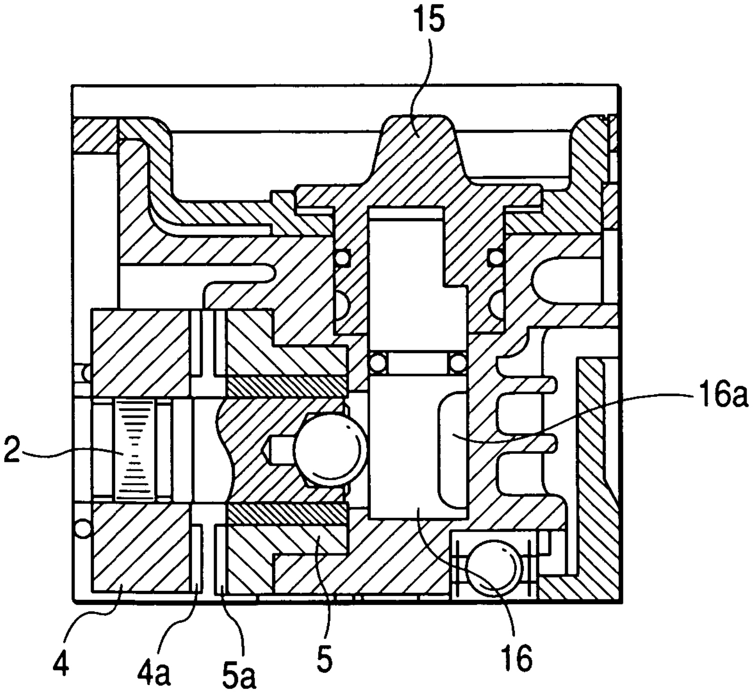
FIG. 2 is an explanatory view of the impact drill in a drill mode.
Figure 3:
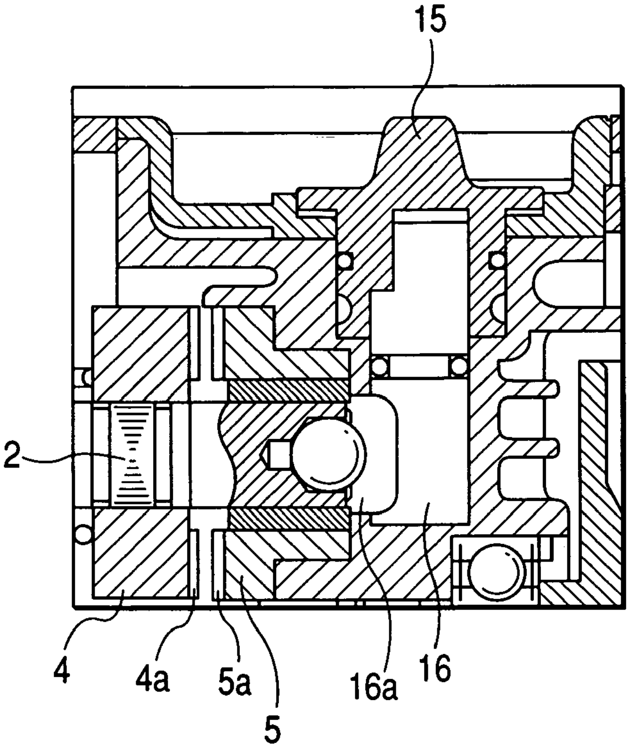
FIG. 3 is an explanatory view of the impact drill in an impact drill mode.
Figure 4:
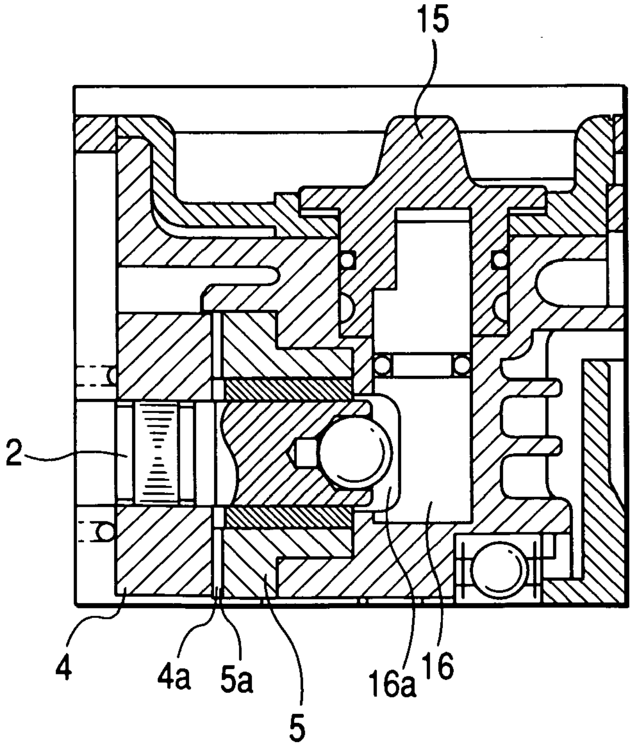
FIG. 4 is an explanatory view of the impact drill in the impact drill mode.
Figure 5:
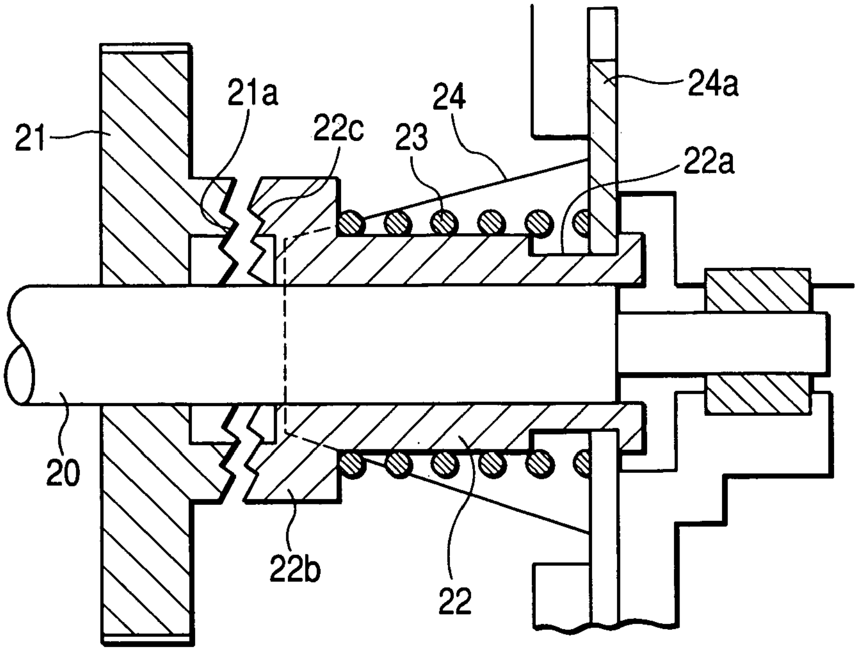
FIG. 5 is a partial constitutional view showing another example of the conventional impact drill.
Figure 6:
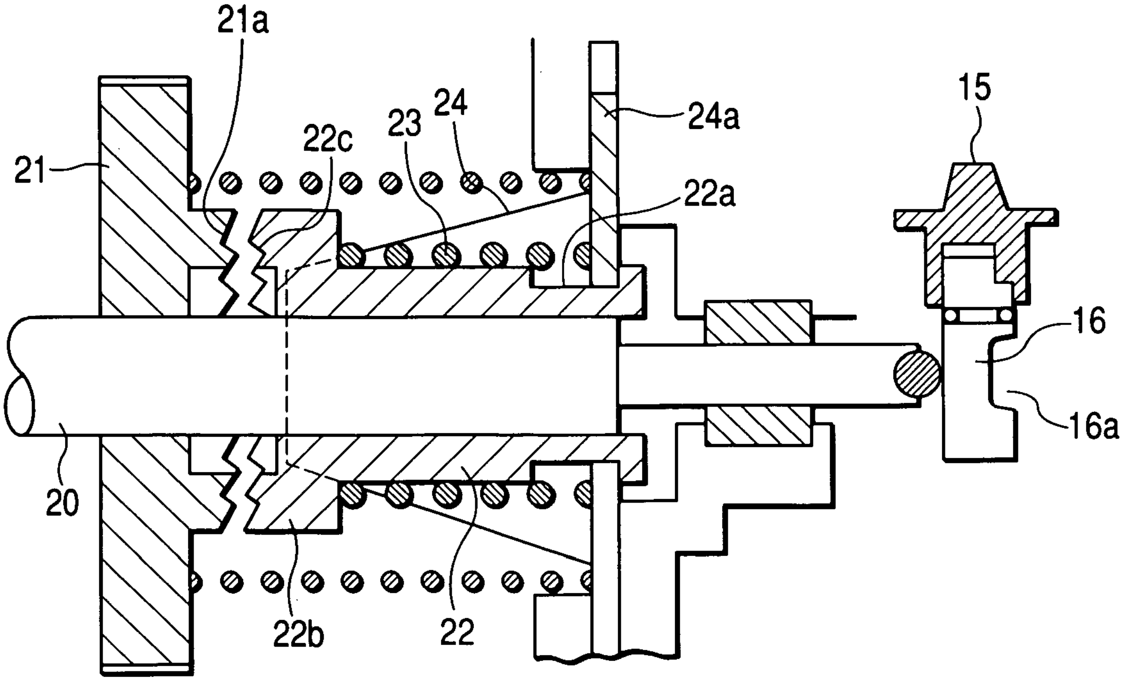
FIG. 6 is an explanatory view of another example of the conventional impact drill in the drill mode.
Figure 7:
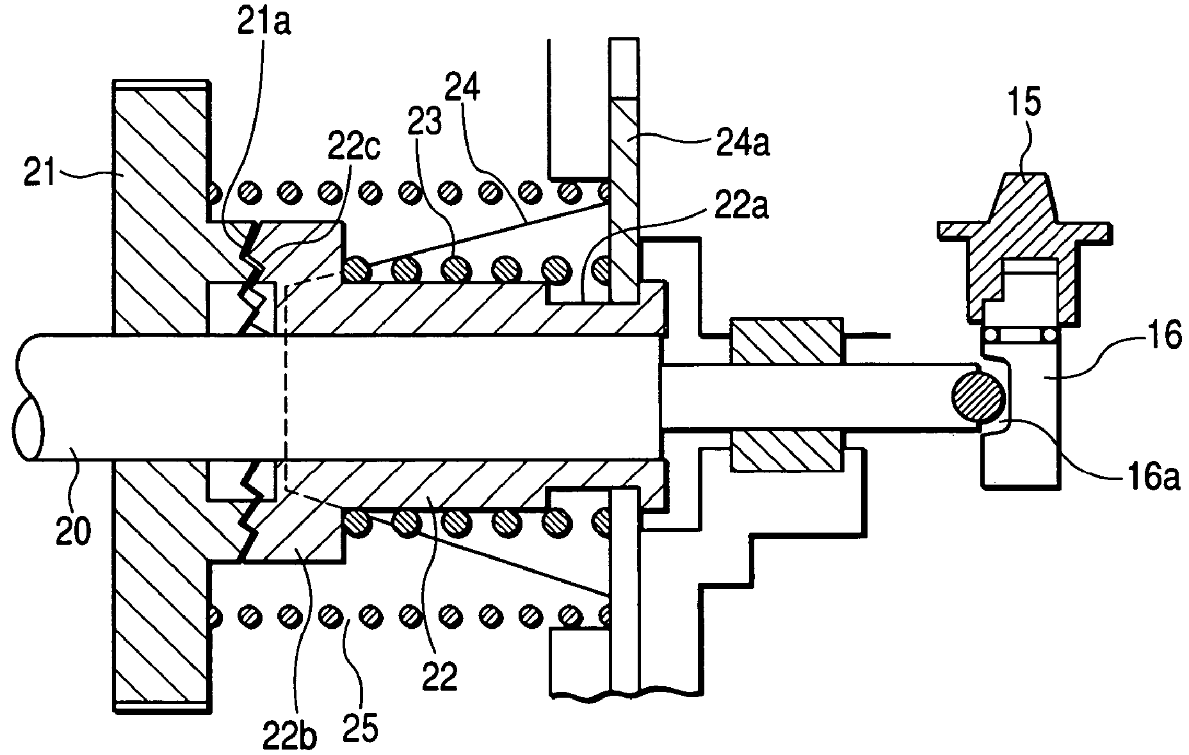
FIG. 7 is an explanatory view of another example of the conventional impact drill in the impact drill mode.

The preferred embodiments of the present invention will be described below in detail.

First Embodiment

FIGS. 8, 9, 10 and 11 are constitutional views of a main portion of an impact drill according to a first embodiment of the invention. Firstly, referring to FIG. 8, the constitution of each part will be described below.

A spindle 102 is provided in a main frame portion 101 and moved forward (to the left in the figure) or backward (to the right in the figure) relative to a workpiece 119. A chuck 103 for mounting a drill bit 118 is provided at the top end of the spindle 102. A first ratchet 104 and a second ratchet 105 are provided in the almost central part of the main frame portion 101. The first ratchet 104 is rotated along with the spindle 102 and moved axially, and has serrated irregularities 104*a* on one face. The second ratchet 105 is formed with serrated irregularities 105*d* on a bottom portion 105*c*. Also, the second ratchet 105 has a dual cylindrical shape, in which an inner cylindrical portion 105*a* slides on the spindle 102 and an outer cylindrical portion 105*b* slides in the axial direction of the spindle 102 along an inner wall of the main frame portion 101, but has a notch portion in a part on the circumferential face to prevent rotational motion.

Moreover, a side wall portion 122 extends in a direction of the spindle inside the main frame portion 101, and a spring 120 is provided between the side wall portion 122 and the cylindrical bottom portion 105*c*. Reference numeral 109 denotes a rotation shaft to which a rotational driving force is transmitted from a motor (not shown), in which its rotational driving force is transmitted via a gear 110 to a second pinion 111. Reference numeral 112 denotes a low speed gear, 113 denotes a high speed gear, and 114 denotes a clutch disk, in which when the clutch disk 114 is at the position as shown, a rotational force is transmitted via the low speed gear 112 to the spindle 102.

On the other hand, if the clutch disk 114 is rotated to the position where the high speed gear 113 and the spindle 102 are engaged by rotating a change lever 117, a rotational force of the second pinion 111 is transmitted via the high speed gear 113 to the spindle 102. Accordingly, the spindle 102 can be rotated at low speed or high speed depending on the rotated position of the change lever 117.

As a result of the experiment, it has been confirmed that the vibration transmitted to the user in the drilling operation, namely, the vibration of an impact drill main body, is reduced owing to the above configuration.

Figure 16:
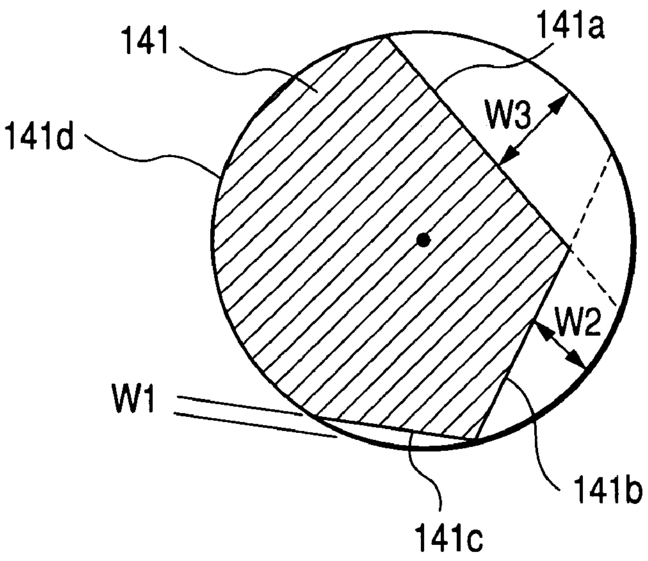
FIG. 16 is an explanatory view of a change shaft of the impact drill according to the first embodiment of the invention.

According to first embodiment of the invention, a steel ball 125 is provided at a rear end of the spindle 102, and contacted with a columnar change shaft 141 having a plurality of notch portions different in the depth. FIG. 16 shows a sectional face of the change shaft 141 taken along the A—A plane of FIG. 8. In this example, there are a face 141*a* having the largest notch depth W3, a face 141*b* having the next largest notch depth W2, a face 141*c* having the smallest notch depth W1, and a columnar face 141*d* without notch. This change shaft 141 is engaged with a change lever 140, and the contact face with the steel ball 125 is changed in the order of 141*a*, 141*b*, 141*c* and 141*d* by rotating the change lever 140.

The operation of the impact drill with the above constitution will be described below.

(a) Drill Mode

Figure 8:
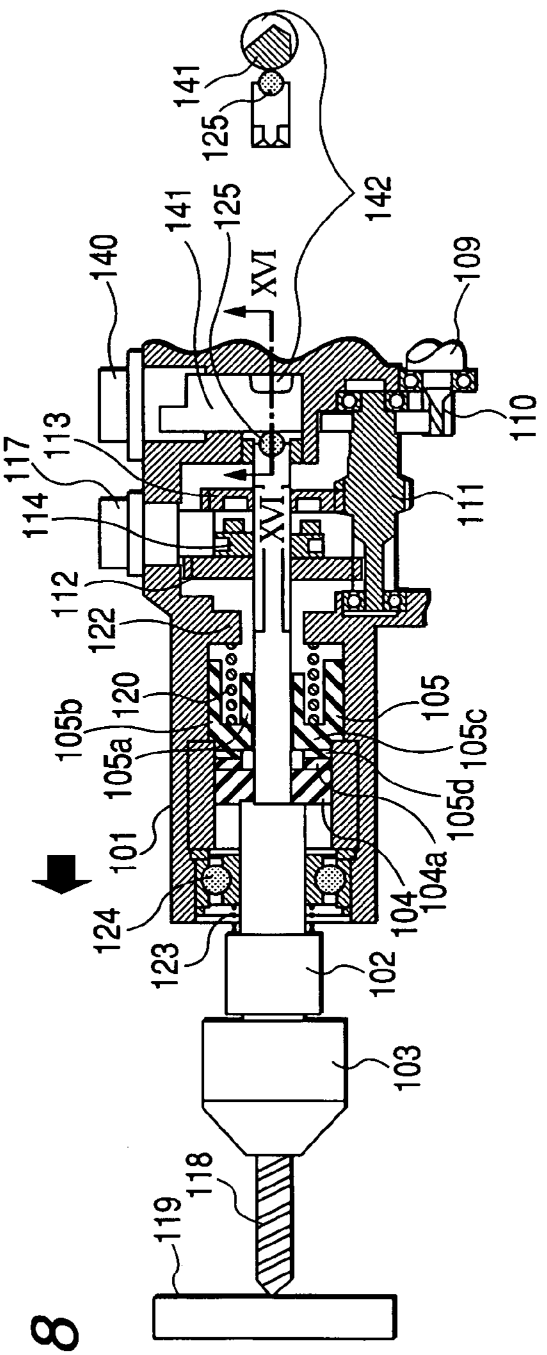
FIG. 8 is a cross-sectional view showing an impact drill according to a first embodiment of the invention, in the drill mode.

A drill mode is shown in FIG. 8. That is, the change shaft 141 is rotated by turning the change lever 140, so that the steel ball 125 disposed at the rear end of the spindle 102 is contacted with a part of the change shaft 141 without notch portion 142, namely, the face 141*d* of FIG. 16. In this positional relation, even when the main frame portion 101 is pressed in the direction of the arrow, a serrated irregular portion 104*a* of the first ratchet 104 and a serrated irregular portion 105*d* of the second ratchet 105 are not engaged, causing no vibration, whereby the impact drill is operated as the normal drill mode.

(b) Weak Stroke Impact Drill Mode

Figure 9:
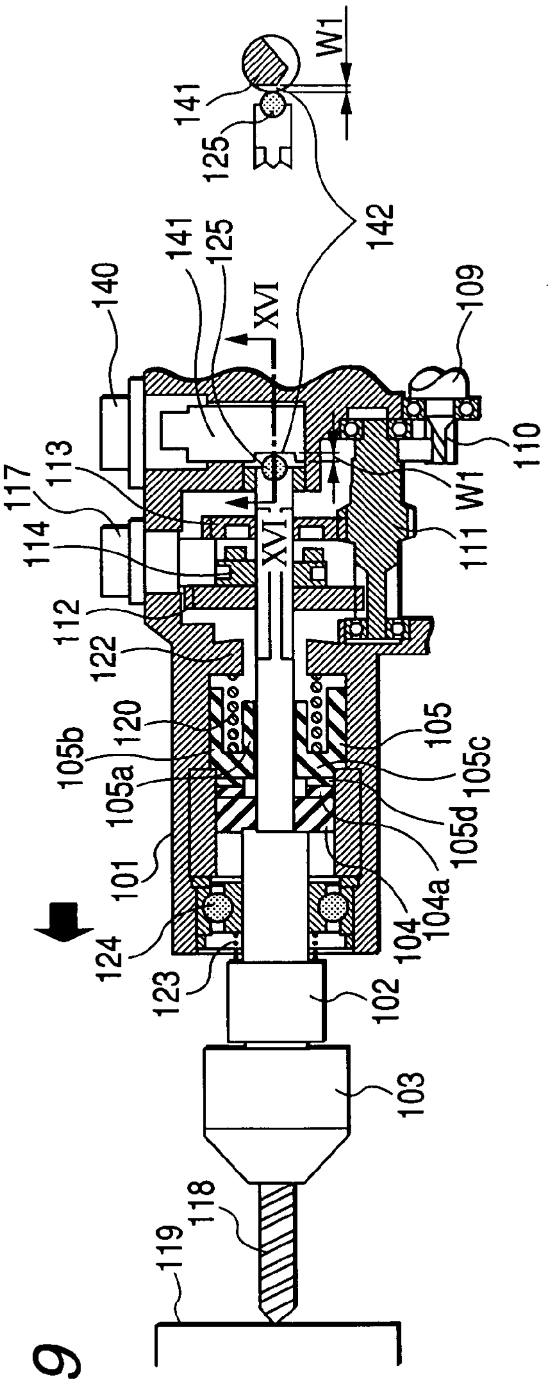
FIG. 9 is a cross-sectional view showing the impact drill according to the first embodiment of the invention, in a weak stroke mode.

FIG. 9 shows a weak stroke mode of the impact drill. By turning the change lever 140 from the state of FIG. 8, the steel ball 125 at the rear end of the spindle 102 is contacted with the face 141*c* of the change shaft 141 having the smallest notch depth W1. This notch depth W1 is regulating the movement of the spindle 102 to the extent that the serrated irregular portion 104*a* of the first ratchet 104 and the serrated irregular portion 105*d* of the second ratchet 105 are lightly contacted at the tip. In this positional relation, even when the main frame portion 101 is pressed with a great force in the direction of the arrow, the restoring force of the spring 120 is small, and the impact force occurring between the first ratchet 104 and the second ratchet 105 is small. Accordingly, when this small impact force is sustained, this weak stroke mode is advantageous in prudently drilling the hard, thin tile or the like.

(c) Strong Stroke Impact Drill Mode

Figure 10:
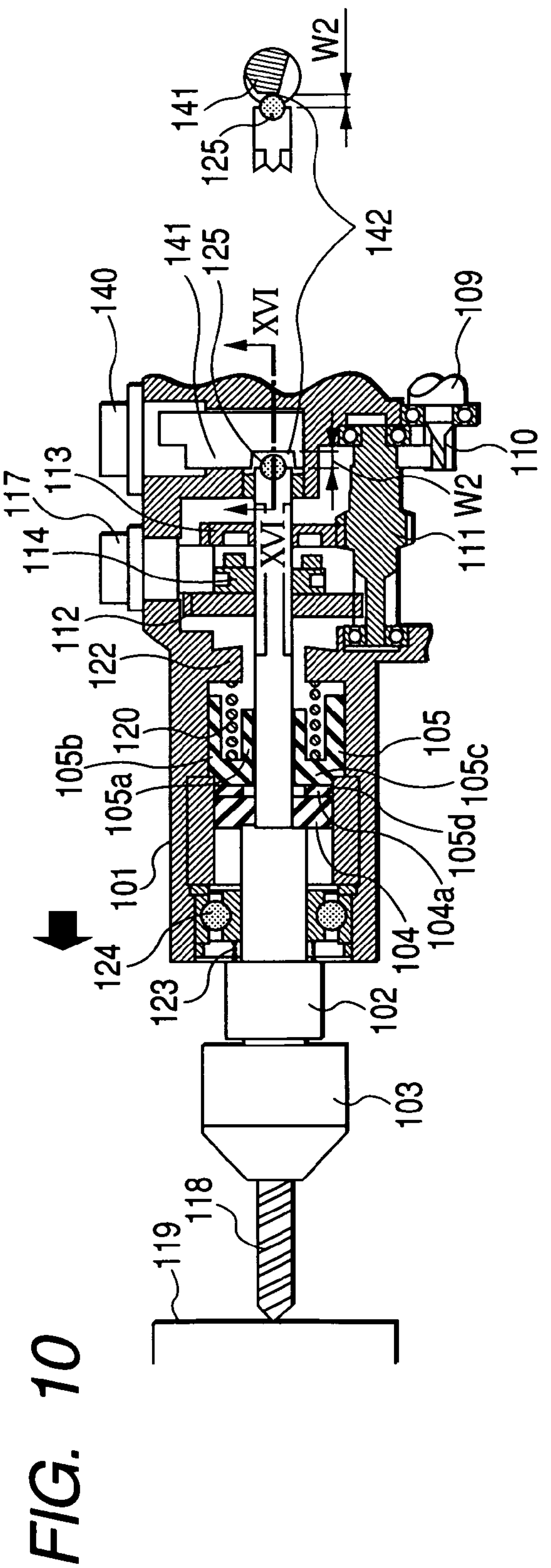
FIG. 10 is a cross-sectional view showing the impact drill according to the first embodiment of the invention, in a strong stroke mode.

FIG. 10 shows a strong stroke mode of the impact drill. By further turning the change lever 140 from the state of FIG. 9, the steel ball 125 at the rear end of the spindle 102 is contacted with the face 141*b* of the change shaft 141 having the larger notch depth W2. This notch depth W2 is regulating the movement of the spindle 102 to the extent that the serrated irregular portion 104*a* of the first ratchet 104 and the serrated irregular portion 105*d* of the second ratchet 105 are engaged to the bottom. Thus, the second ratchet 105 is moved further backward from the position of FIG. 9, the restoring force of the spring 120 is great, and the impact force occurring between the first ratchet 104 and the second ratchet 105 is great. Accordingly, when this great impact force is sustained, this strong stroke mode is optimal in prudently drilling the mortar wall or the like at high drilling speed.

(d) Stroke Force Variable Impact Drill Mode

Figure 11:
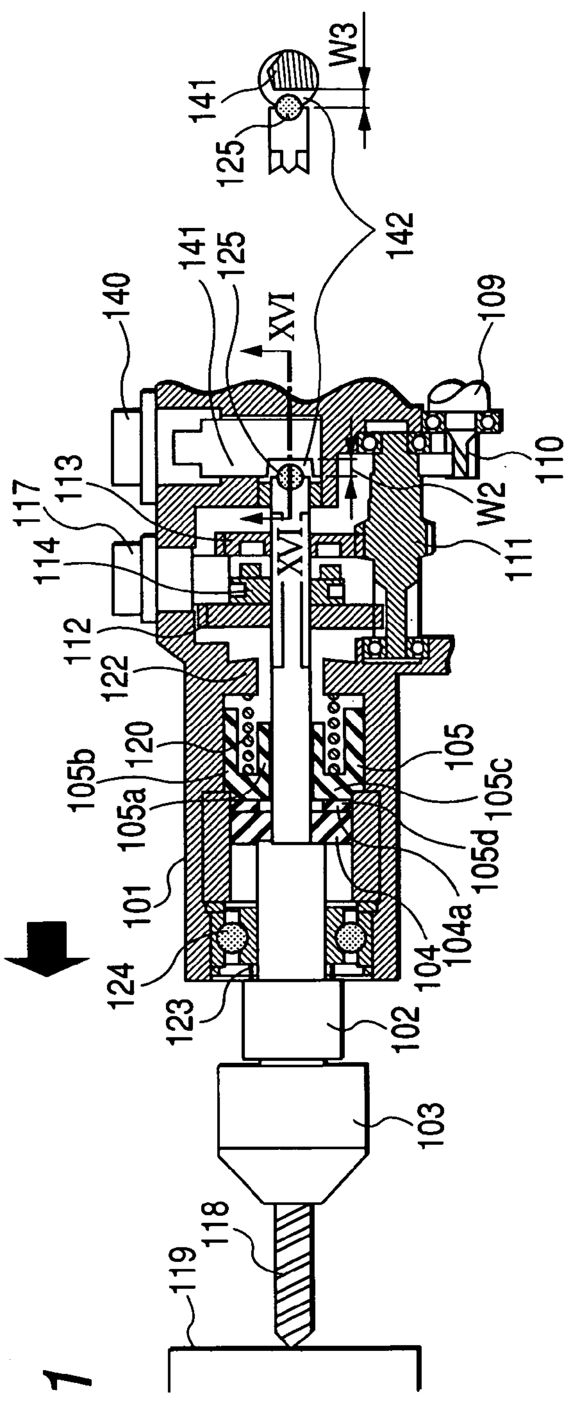
FIG. 11 is a cross-sectional view showing the impact drill according to the first embodiment of the invention, in a stroke force variable mode.

FIG. 11 shows a stroke force variable mode of the impact drill. By further turning the change lever 140 from the state of FIG. 10, the steel ball 125 at the rear end of the spindle 102 is opposed to the face 141*a* of the change shaft 141 having the largest notch depth W3. This notch depth W3 is regulating the movement of the spindle 102 to the extent that the serrated irregular portion 104*a* of the first ratchet 104 and the serrated irregular portion 105*d* of the second ratchet 105 are engaged to the bottom, the main frame portion 101 is further pressed in a direction of the arrow, and the rear end 105*e* of the second ratchet 105 does not abut against a main extension frame 122 even when the second ratchet 105 is moved backward. In this positional relation, when the main frame portion 101 is pressed according to the feeling of the operator himself or herself, the restoring force of the spring 120 is similarly changed depending on the magnitude of pressing force, whereby the operator can perform the operation by adjusting the magnitude of stroke force according to the force of pressing the main frame portion 101.

As described above, with the first embodiment, the change lever 140 is rotated by changing the face of the change shaft 141 in contact with the steel ball 125, whereby vibration modes for various stroke forces can be implemented.

Second Embodiment

Figure 12:
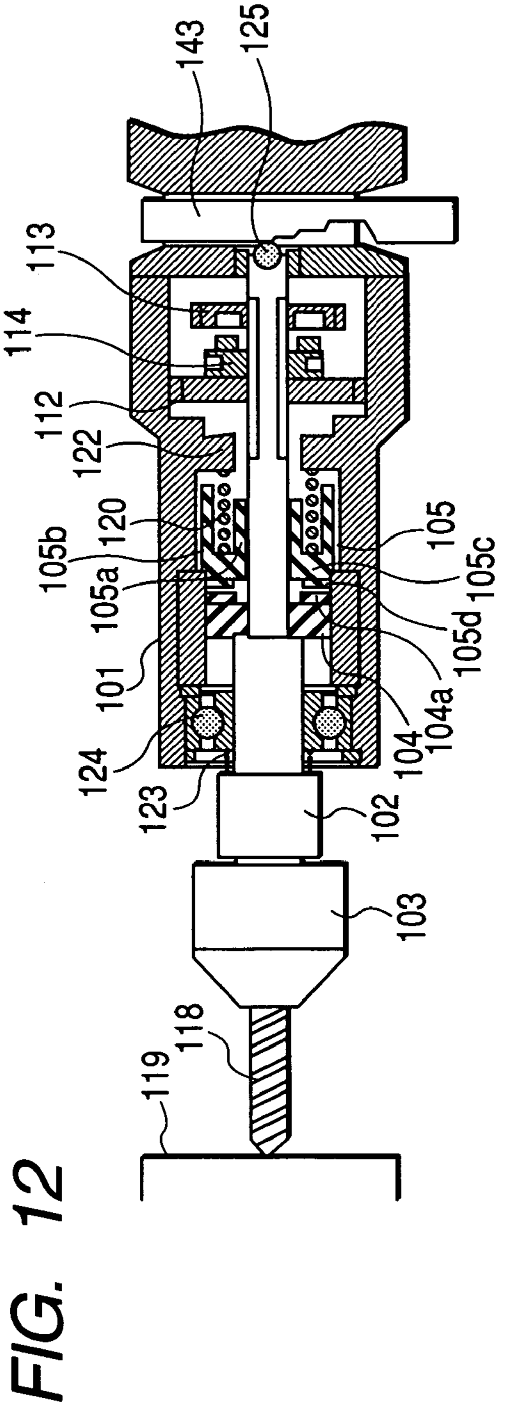
FIG. 12 is a cross-sectional view showing an impact drill according to a second embodiment of the invention, in the drill mode.

FIG. 12 shows a second embodiment of the invention, which has one feature in that the steel ball 125 provided at a rear end of the spindle 102 is contacted with a plate-like change lever 143 having the step portions different in the depth.

Figure 17:
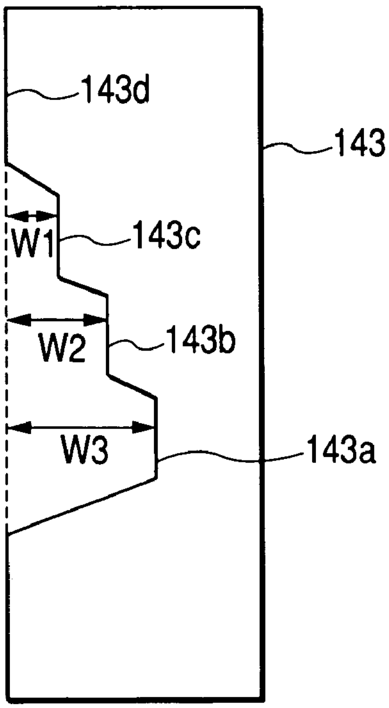
FIG. 17 is an explanatory view of a plate-like change lever of the impact drill according to the second embodiment of the invention.

That is, FIG. 17 shows the plate-like change lever 143 in enlargement, which has a face 143*a* having the largest step W3, a face 143*b* having the next largest step W2, a face 143*c* having the smallest step W1, and a face 143*d* without step. This plate-like change lever 143 is provided movably in the vertical direction, whereby the contact face with the steel ball 125 is changed in accordance with its position. FIGS. 12 to 15 are cross-sectional views of the impact drill as looked from the above (opposite to the side where the handle portion 6 is provided in FIG. 1). Accordingly, since the change lever 143 is provided movably in the left-to-right direction of the impact drill, one end of the change lever 143 can be pressed by a forefinger, and the other end pressed by a thumb, when the handle portion 6 is grasped, whereby the operability is excellent.

(a) Drill Mode

A drill mode is shown in FIG. 12. That is, the face 143*d* without step of the plate-like change lever 143 is contacted with the steel ball 125. In this positional relation, even when the main frame portion 101 is pressed in the direction of the arrow, a serrated irregular portion 104*a* of the first ratchet 104 and a serrated irregular portion 105*d* of the second ratchet 105 are not engaged, causing no vibration, whereby the impact drill is operated as the normal drill mode.

(b) Weak Stroke Impact Drill Mode

Figure 13:
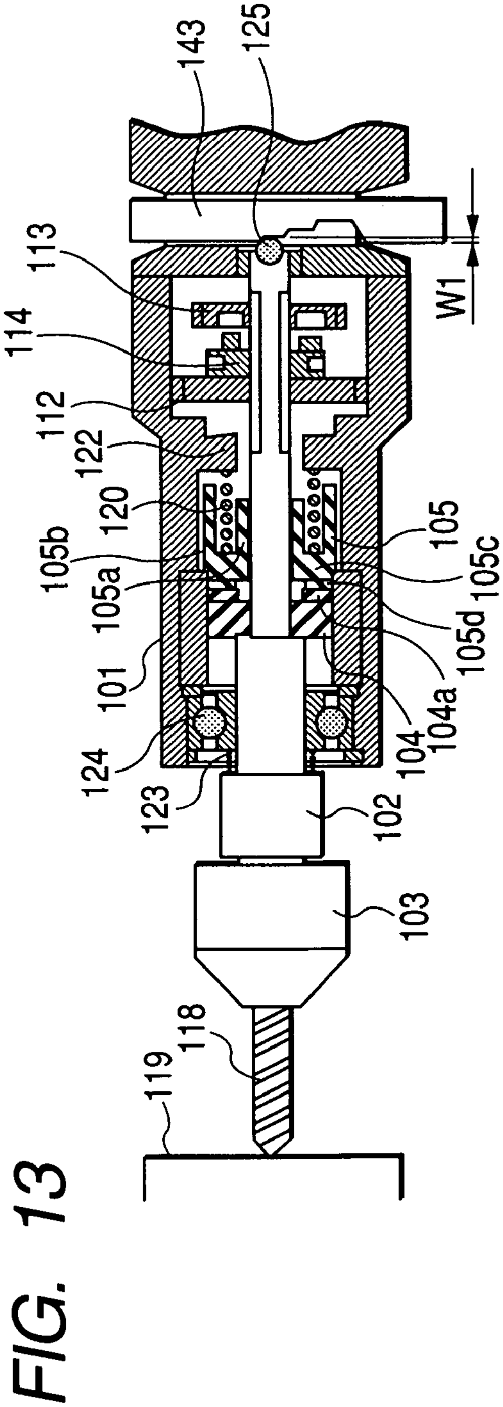
FIG. 13 is a cross-sectional view showing the impact drill according to the second embodiment of the invention, in the weak stroke mode.

FIG. 13 shows a weak stroke mode of the impact drill. By pressing down the plate-like change lever 143 from the state of FIG. 12, the steel ball 125 is contacted with the face 143*c* having the smallest step W1. This step W1 has the depth of regulating the movement of the spindle 102 to the extent that the serrated irregular portion 104*a* of the first ratchet 104 and the serrated irregular portion 105*d* of the second ratchet 105 are lightly contacted at the tip. In this positional relation, even when the main frame portion 101 is pressed with a great force in the direction of the arrow, the restoring force of the spring 120 is small, and the impact force occurring between the first ratchet 104 and the second ratchet 105 is small.

(c) Strong Stroke Impact Drill Mode

Figure 14:
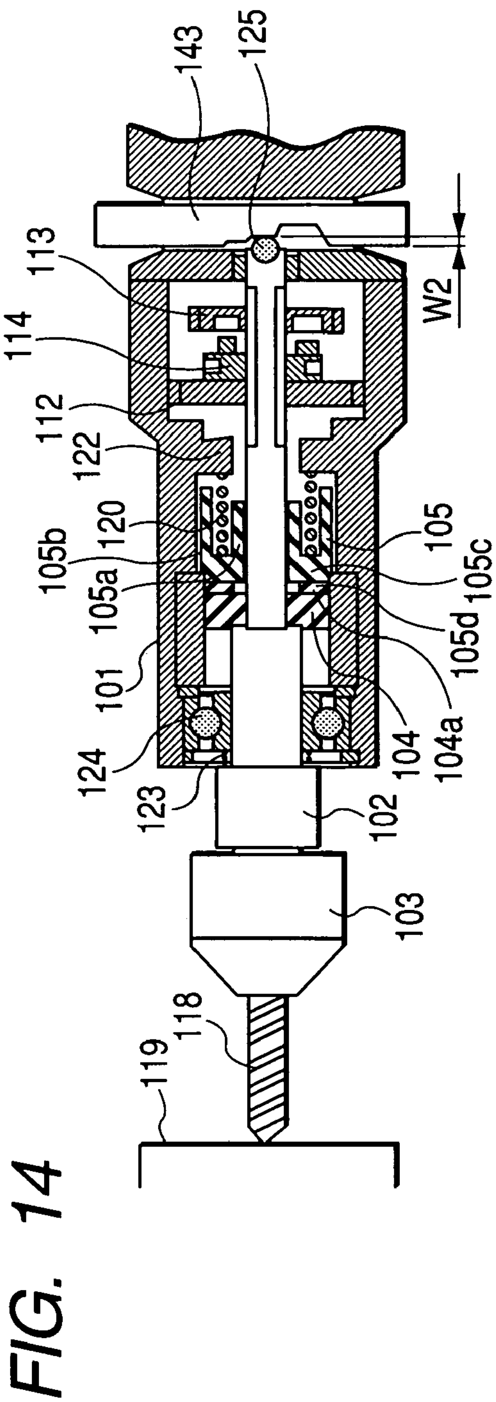
FIG. 14 is a cross-sectional view showing the impact drill according to the second embodiment of the invention, in the strong stroke mode.

FIG. 14 shows a strong stroke mode of the impact drill. By further pressing down the plate-like change lever 143 from the state of FIG. 13, the steel ball 125 is contacted with the face 143*b* having the step W2. This step W2 has the depth of regulating the movement of the spindle 102 to the extent that the serrated irregular portion 104*a* of the first ratchet 104 and the serrated irregular portion 105*d* of the second ratchet 105 are engaged to the bottom. Thus, the second ratchet 105 is moved further backward from the position of FIG. 9, the restoring force of the spring 120 is great, and the impact force occurring between the first ratchet 104 and the second ratchet 105 is great.

(d) Stroke Force Variable Impact Drill Mode

Figure 15:
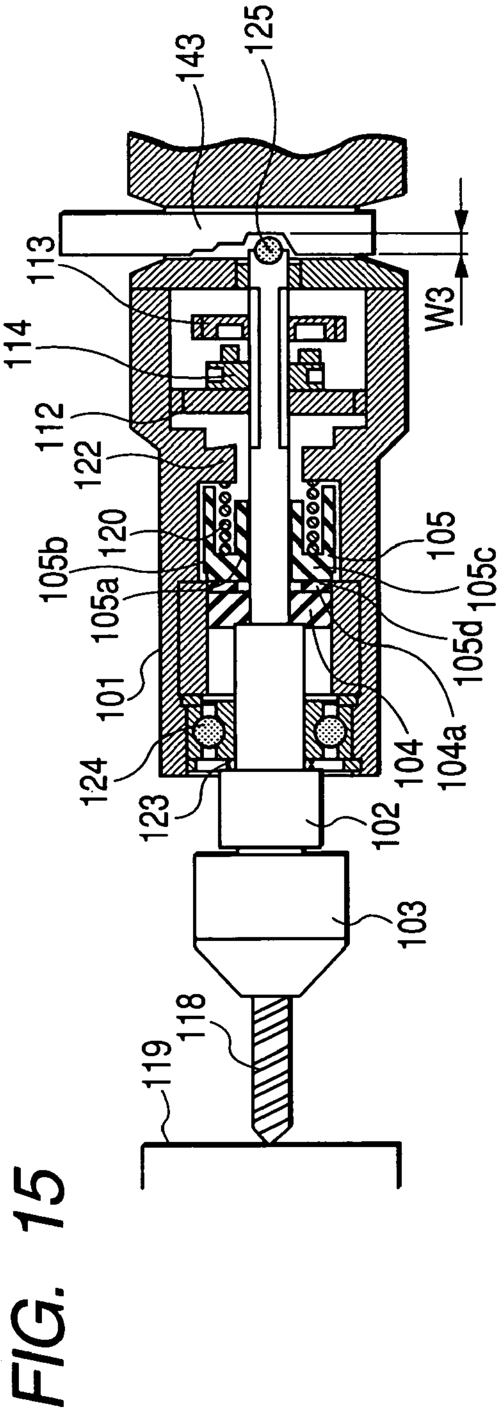
FIG. 15 is a cross-sectional view showing the impact drill according to the second embodiment of the invention, in the stroke force variable mode.

FIG. 15 shows a stroke force variable mode of the impact drill. By further pressing down the plate-like change lever 143 from the state of FIG. 14, the steel ball 125 is contacted with the face 143*a* having the largest step W3. This step W3 has the depth of regulating the movement of the spindle 102 to the extent that the serrated irregular portion 104*a* of the first ratchet 104 and the serrated irregular portion 105*d* of the second ratchet 105 are engaged to the bottom, the main frame portion 101 is further pressed in a direction of the arrow, and the rear end 105*e* of the second ratchet 105 does not abut against a main extension frame 122 even when the second ratchet 105 is moved backward. In this positional relation, when the main frame portion 101 is pressed according to the feeling of the operator himself or herself, the restoring force of the spring 120 is similarly changed depending on the magnitude of pressing force, whereby the operator can perform the operation by adjusting the magnitude of stroke force according to the force of pressing the main frame portion 101.

What is claimed is:

1. An impact drill comprising:
- a spindle rotated by a motor and movable in an axial direction;
- a drill chuck fixed to the spindle and mountable with a drill bit;
- a first ratchet fixed to the spindle and having a face of an irregular portion;
- a second ratchet having a face of an irregular portion opposed to the face of the irregular portion of the first ratchet and movable in the axial direction but unrotatable; and
- a spring for urging the second ratchet in a direction of the first ratchet, in which the spindle is given an axial vibration by a contact and separation action between the irregular faces of the first ratchet and the second ratchet due to a relative rotation of the first ratchet to the second ratchet,
- wherein a regulating member regulates an amount of movement of the spindle at a plurality of positions in a range where the first ratchet and the second ratchet can be engaged.

2. The impact drill according to claim 1, wherein
- the regulating member is movable relative to a main frame portion to come into contact with the spindle, and
- the regulating member is formed to gradually change an interval between the spindle and the regulating member, when the regulating member is moved relative to the main frame portion.

3. The impact drill according to claim 1, wherein
- the regulating member comprises a columnar shape,
- the regulating member comprises a plurality of notch portions having a different distance from a center of the regulating member, and
- the regulating member is rotatably provided in the main frame portion so as to make the notch portions contactable with the spindle.

4. The impact drill according to claim 1, wherein
- the regulating member comprises a plate-like shape,
- the regulating member comprises a plurality of step portions having a different depth, and
- the regulating member is movably provided in the main frame portion so as to make the step portions contactable with the spindle.

5. The impact drill according to claim 1, further comprising:
- a first mode of regulating the movement amount of the spindle movable in the axial direction to a minimum value;

a second mode of regulating the movement amount to a middle value; and a third mode of regulating the movement amount to a maximum value.

6. The impact drill according to claim 5, wherein the first mode comprises a mode of regulating the movement amount of the spindle to an extent that the irregular portion of the first ratchet and the irregular portion of the second ratchet are contacted with each other.

7. The impact drill according to claim 5, wherein the second mode comprises a mode of regulating the movement amount of the spindle to an extent that the irregular portion of the first ratchet and the irregular portion of the second ratchet are engaged with each other at a bottom portion of the first ratchet and the second ratchet.

8. The impact drill according to claim 5, wherein the third mode comprises a mode of regulating the movement amount of the spindle to an extent that the irregular portion of the first ratchet and the irregular portion of the second ratchet are engaged with each other to a bottom portion of the first ratchet and the second ratchet, and the second ratchet is further moved backward by pressing a main frame of the impact drill onto a workpiece.

9. The impact drill according to claim 5, further comprising:

a fourth mode of regulating the movement amount of the spindle to an extent that the irregular portion of the first ratchet and the irregular portion of the second ratchet are not contacted with each other.

10. The impact drill according to claim 1, wherein said regulating member regulates the amount of movement of the spindle to control an operation mode of the impact drill and to control a degree of impact force of the impact drill.

11. The impact drill according to claim 1, wherein said regulating member regulates the amount of movement of the spindle to control a plurality of operation modes of the impact drill.

12. The impact drill according to claim 11, wherein the plurality of impact modes comprises at least one of a drill mode, a weak stroke impact drill mode, a strong stroke impact drill mode and a stroke force variable impact drill mode.

13. The impact drill according to claim 1, wherein said regulating member regulates the amount of movement of the spindle to control an impact force of the impact drill.

14. The impact drill according to claim 1, wherein said regulating member comprises a plurality of notch portions having different depths.

15. An impact drill comprising:

a spindle movable in an axial direction;

a first ratchet fixed to the spindle and having an irregular surface;

a second ratchet having an irregular surface opposed to the irregular surface of the first ratchet and movable in the axial direction but unrotatable;

a spring for urging the second ratchet in a direction of the first ratchet; and a regulating member that controls an amount of impact force of the impact drill by regulating an amount of movement of the spindle.

* * * * *